UNITED STATES PATENT OFFICE.

ALEXANDER PHILIPPI, OF ST. LOUIS, MISSOURI.

IMPROVEMENT IN GRAIN-BINDERS.

Specification forming part of Letters Patent No. 142,040, dated August 19, 1873; application filed April 21, 1873.

*To all whom it may concern:*

Be it known that I, ALEXANDER PHILIPPI, of St. Louis, in the county of St. Louis and State of Missouri, have invented an Improved Grain-Binding Machine, of which the following is a specification:

This invention is designed as an attachment to harvesters, being an improved grain-binder, which receives from the platform of the harvester, by means of reverse operating aprons, the grain or gavels into a receiving and detaining crib, from whence it is dropped upon a sliding binding-frame between compressing fingers, to be compressed by the same preparatory to being tied, the completed bundles being further retained and carried upon a pivoted platform until the required number of bundles has been completed, which can then be finally dropped from said platform in heaps for shocking.

The nature of this invention relates, first, to the formation of a basket or crib in sections, and the manner of operating the same by foot-pressure of operator to open and drop its contents, or to close and receive and retain the elevated gavels. Secondly, to the arrangement of a sliding binding-frame, carrying the compressing-fingers, and the manner of operating same by foot-pressure of the operator simultaneous with the connections that operate the crib above, so that when said finger devices are operated to close by the same motion the crib is closed, and, vice versa, when the fingers are operated to open, the crib shall open to let its grain drop between said fingers, preparatory to being compressed and tied into bundles. Lastly, to certain detail construction of parts, all of which will now more fully appear.

To enable those herein skilled to make and use my said improvements, I will now more fully describe the same, referring to—

Figure 1:
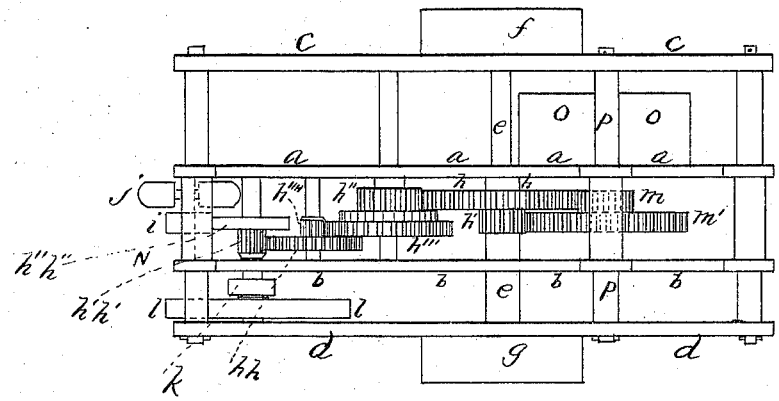
Figures 2, 3:
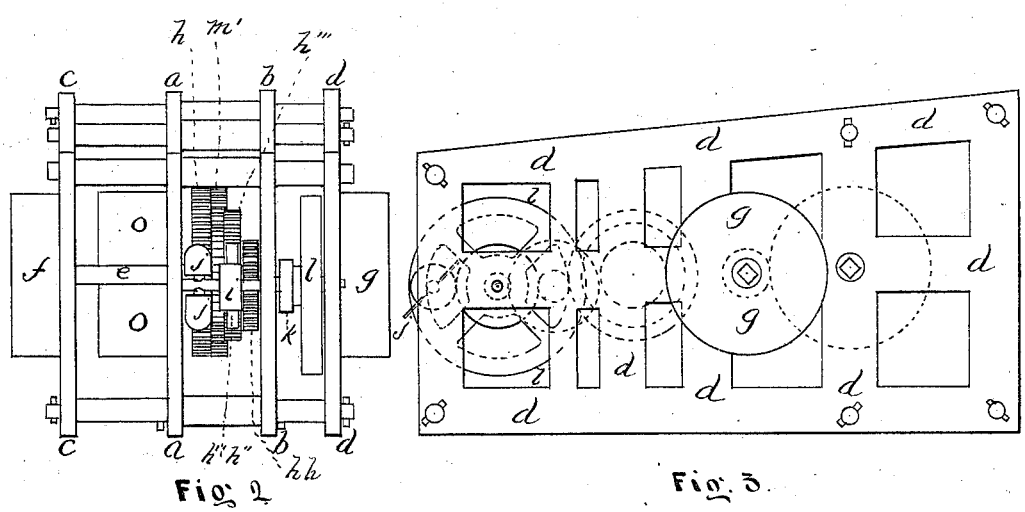

Figure 1, Sheet 1, as a rear elevation; to Fig. 2, Sheet 1, as a side elevation; to Fig. 3, Sheet 2, as a top plan; and to Fig. 4, Sheet 2, as an enlarged perspective view of binding sliding frame with its operating devices.

A represents a proper frame, upon which the operating mechanism is mounted. In the side of frame A, I arrange reverse-revolving aprons $A^1$ $A^2$, consisting of suitable cloth material, properly slatted, passing round respective upper and lower drums-shafts $a$ $a^1$ $a^2$ $a^3$. The lower drums $a$ $a^1$ are supported in proper journal-bearings on frame A, the upper drums $a^2$ $a^3$ turning in side supports $a^4$, which are bolted to the top of frame A. The rotary motion to the respective aprons $A^1$ $A^2$ is imparted by the driving-wheel of the reaper, having its driving-gear meshing with a pinion, $a^5$, on the drum-shaft $a$, said pinion further meshing with a pinion, $a^6$, on the drum-shaft $a^1$. (See Fig. 1 and 3.) The aprons are thus made reverse acting. The platform of the reaper will be provided with a revolving apron, so as to carry the grain in line between the aprons $A^1$ $A^2$, which further take up the grain and elevate the same to the top of the apron. The grain at top is prevented from being carried over the apron $A^2$, being guided and passed over the top of the apron $A^1$ by a comb, consisting of frame B with cross-slats $b$. (See Figs. 1 and 3.) The comb B is securely bolted to the top of frame A, and further has its slats $b$ provided with flexible ends $b^1$, Figs. 1 and 3; the latter especially resting on top of the apron $A^2$ prevents the grain being passed over the same. The elevated grain is received into a basket or crib, C. The crib is formed of a rear and front section, which consist of upright slats $c$ $c^1$, curved inward to close between each other at bottom. (See Figs. 1 and 3.) The rear section $c$, by its cross-frame $c^2$, is bolted permanently to frame A, Figs. 1 and 2, while the front or movable section is pivoted by its frame $c^3$ to the side supports $a^4$, Figs. 1 and 3, the object of thus forming the crib C in section, being to open and close the same to drop or retain the grain preparatory to the action of the compressing-finger devices. D, Figs. 1, 3, and 4, is a binding-frame; this is secured adjustably in a proper manner, so as to have a sliding movement upon the top of the frame A, the sliding motion of the frame D being important to suit the position of the compressing-fingers to the length or sizes of the sheaves preparatory to a proper binding of same in the middle. $d$ $d^1$ are ordinary compressing-fingers, these being keyed to ends of the respective shafts $d^2$ $d^3$, which turn in proper journal-bearings on the binding-frame D. (See Fig. 4.)

A. N. PROCTOR.
Motor for Driving Machinery.

No. 142,041.  Patented August 19, 1873.

WITNESSES.
E. H. Ober.
D. J. Butler.

Alfred N. Proctor, INVENTOR

By his Att'ys
Henry W. Williams & Co.

AM. PHOTO-LITHOGRAPHIC CO. N.Y. (OSBORNE'S PROCESS.)